Oct. 17, 1939.                F. WHYMAN                2,176,728
                    ELECTRIC MOTOR CONTROL SYSTEM
                         Filed June 3, 1938
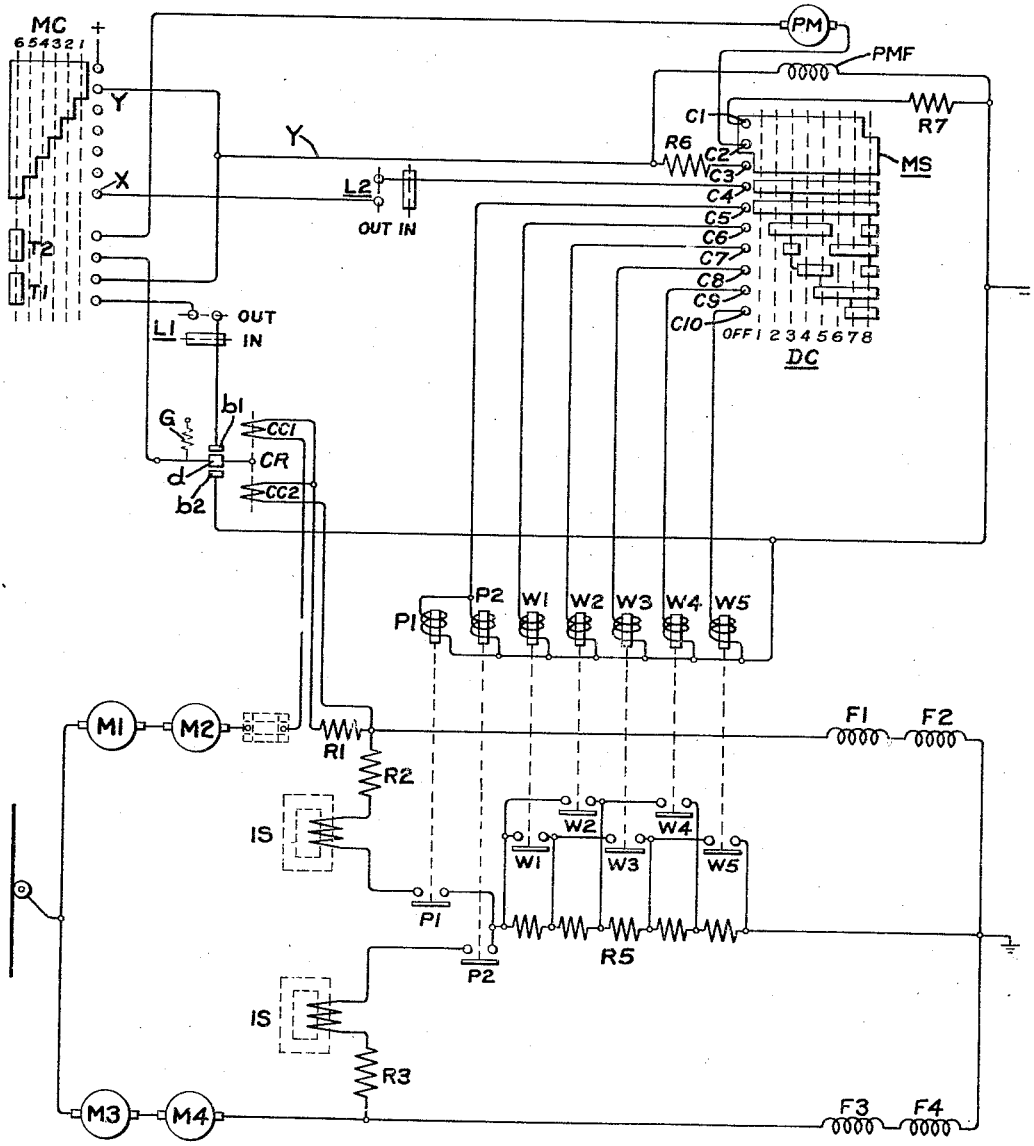
Inventor:
Frank Whyman,
by Harry E. Dunham
  His Attorney.

Patented Oct. 17, 1939

2,176,728

UNITED STATES PATENT OFFICE 2,176,728

ELECTRIC MOTOR CONTROL SYSTEM

Frank Whyman, Timperley, England, assignor to General Electric Company, a corporation of New York Application June 3, 1938, Serial No. 211,659
In Great Britain June 11, 1937

6 Claims. (Cl. 172—179)

This invention relates to electric motor control systems, more particularly to control equipment for electric locomotives and the like.

Electric locomotives are usually provided with a manually operated master controller providing a number of speeds.

When the controller is at the maximum speed position the series wound motors will be running with weak fields, consequently should the train come to an up gradient the additional load will cause the train to take a heavy line current. This current may be considerably heavier than that which the motors are designed to carry, so that unless the driver moves the controller to a lower speed position there is a risk either of damaging the motors, or of tripping the protective gear and bringing the train to a standstill.

The main object of the present invention is to provide an improved arrangement whereby the locomotive may be efficiently operated over varying gradients.

According to the invention the master controller is provided with a maximum speed position wherein the motor field strength is automatically varied by means responsive to the motor current in such a way as to increase said field strength if the current exceeds a predetermined upper limiting value and reduce said field strength if the current falls below a predetermined lower limit.

Preferably in the maximum speed position a circuit is closed through an inductance and resistances shunting the motor fields or portions thereof, the field strength is then determined by a control device operated in accordance with the motor current so as to increase the resistance in said shunting circuit for an increase of motor current above a predetermined upper value and reduce said resistance for a fall in motor current below a predetermined value and thus tend to maintain the motor current substantially between the predetermined limits.

In some cases the upper and lower values of current may be substantially the same though preferably they are separated by a sufficient amount to avoid hunting.

It will be apreciated that with such arrangements the train will automatically be kept running all the time at the maximum speed which may be obtained without exceeding the upper limit of motor current; the speed will, of course, vary according to the gradient.

Moreover, the arrangement has advantages in the case of multiple operation since each locomotive may govern its motor current independently so that the number of train wires between locomotives are reduced as compared with an arrangement in which manually controlled switching is effected at the maximum speed range, and furthermore, inequalities in tyre wear of the respective locomotives are to some extent compensated by the separate control.

In carrying out the invention the resistance of the shunting circuit may be regulated by a sequence switch controller positioned by a servo device which servo device may be actuated by a device responsive to the motor current when said motor current exceeds or falls below the predetermined limits. Conveniently the servo device comprises a pilot electric motor and the device responsive to the motor current comprises a double acting current limit relay which connects the pilot motor for rotation in the one direction or the other according as the main motor current exceeds or falls below the predetermined limits and means are provided for limiting the movement of the sequence switch controller in either direction.

While it is primarily intended that the governing arrangements in accordance with the invention would be applied with the maximum speed position, it may, in some cases, be applied in addition to other speed positions, for instance the half speed position.

In order that the invention may be more clearly understood reference will now be made to the accompanying drawing, the single figure of which shows an example of a control system embodying the invention for a locomotive equipment employing four driving motors.

In the drawing only those parts are shown which are essential for understanding the invention. It is assumed that in the arrangement shown the locomotive is provided with the usual series parallel changeover switch (not shown) which connects the motors in series for slow running and in parallel for fast running. A master controller MC is also provided which varies the amount of resistance in the motor armature circuit.

The drawing shows the motor circuit when the motors are connected in full parallel with all the resistance cut out by the master controller.

It will be observed that the motor armatures M1 and M2 with their corresponding field windings F1 and F2 are in one parallel branch, whilst the motor armatures M3 and M4 and their corresponding field windings F3 and F4 are in the other branch.

In order to obtain a higher speed the master controller is provided with a further weak field position in which the motor fields are shunted through a resistance and the amount of resistance in the shunting circuit governed in accordance with the motor current. In the example shown, however, this position of the master controller is only effective when the series parallel switch is in the parallel position as will be described hereafter.

The shunting of the field windings is effected by closure of the switch contacts $p1$ and $p2$ so that the field windings F1 and F2 are shunted through the branch circuit containing an impedance, shown as a resistance R2, the left-hand inductive solenoid IS, the switch contacts $p1$ and the sectionalised resistance indicated generally by the reference R5. Similarly the field windings F3 and F4 are shunted through the resistance R3, the right-hand inductive solenoid IS, the switch contacts $p2$ and again through the sectionalised resistance R5. Thus it will be observed that the sectionalised resistance R5 is in the shunting circuits of both the windings F1 and F2 and also windings F3 and F4 so that variation of this resistance by means of contacts $w1$—$w5$ will affect all the motors in a similar manner.

In the control circuit shown, DC is a rotary drum controller or regulating means which controls the operating coils P1 and P2 of the switch contacts $p1$ and $p2$, and also controls the operating coils W1—W5 of the contacts $w1$—$w5$ of Fig. 1. The positioning of the drum controller DC is determined by a pilot motor having an armature PM and field winding PMF and the action of this pilot motor is in turn controlled by a relay CR. The relay CR is a double-acting relay, the armature carrying a contact $d$ which in one extreme position engages with a fixed contact $b1$ and in the other extreme position with a fixed contact $b2$. The relay armature is biased by means of a spring G so that normally in the off position the moving contact engages with $b1$. The relay is of the polarised type, that is to say, it has a fixed current coil CC1 co-operating with a movable current coil CC2 carried by the armature. The excitation circuits for the coils CC1 and CC2 are shown in the drawing where the coils are shown connected in series with the motor armatures M1 and M2, R1 being a shunting resistance across the coil CC2.

The lead Y is taken to a contact $y$ of the master controller contacts MC, and this is made live as soon as the master controller is moved from its off position. The lead X is connected to the weak field contact $x$ of the master controller contacts and this is made live when the master controller is moved beyond the full parallel position to the maximum speed position 6 in which the governing control operates.

The contacts L1 and L2 are interlock contacts controlled either directly or through a relay from the series parallel switch and are closed when this switch is in the parallel position. The contacts T1 and T2 are interlock contacts controlled either directly as shown or through a relay from the master controller, and these are closed when the master controller is in the full parallel position, i. e., as shown in the drawing.

The operation of the device is as follows:

Assuming the series parallel switch has been moved to the parallel position and the master controller has been moved to the weak field position 6, contacts L1 and L2 and T1, T2 will all be moved to the "in" position, whilst the conductors X and Y will be made live.

The moving contact $d$ of the relay CR will be engaging with the upper contact $b1$ under the action of the biasing spring G, thus a circuit will pass through the armature PM of the pilot motor. This circuit will pass from the positive side of the supply by way of master controller contact $y$ and thence through the supply lead Y, the contacts L1, T1, the upper contact $b1$ and the moving contact $d$ of the relay CR, the interlock contacts T2, the pilot motor armature PM, the limit contacts C1 and C2 across the segment MS on the drum controller and thence through the limiting resistance R7 to the negative side of the supply line.

As the pilot motor field winding PMF is excited as soon as contact $y$ is made live the armature will start to revolve and will rotate the drum DC from the "off" position in which it is shown. As soon as the drum commences to rotate the contacts C4 and C5 will be bridged so that the contactor coils P1 and P2 will be energised and this will close the contacts $p1$ and $p2$ and thus connect the shunting resistance R5 across all the field windings of the motors. Continued movement of the drum DC will successively energise the operating coils W1 W2 . . ., thereby cutting out portions of the shunting resistance R5. This will continue until the motor current reaches such a value that the moving contact $d$ of the relay CR is moved out of engagement with the fixed contact $b1$. When this happens the circuit through the pilot motor PM will be broken and the drum will remain stationary.

Supposing now that the current exceeds the predetermined maximum value so that the moving contact $d$ of the relay CR engages with the lower fixed contact $b2$, the current will then flow through the pilot motor in the opposite direction, the circuit being from the contact $y$ through the lead Y, the resistance R6, the limit contacts C2 and C3 and segment MS, the pilot armature PM, the interlock contact T2 and the moving contact $d$ and fixed contact $b2$ to the negative side of the supply line.

Thus, current will flow through the pilot motor armature but in the reverse direction to that in which it flowed when the moving relay contact $a$ engaged the upper fixed contact $b1$. This will rotate the drum DC backwards so as to increase the resistance in the shunting circuit.

In the drawing the drum controller is shown in the "off" position in which all the contactor coils P1—P2 and W1—W5 are de-energised so that there is no shunting resistance connected across the field windings of the main motors. The pilot motor and current limiting relay are so arranged that when the current falls below the predetermined lower limit the drum controller will be moved forwardly i. e. so that the contacts C1—C10 will assume successive positions 1-10 in a downward direction.

When the master controller MC is moved back to a lower speed position so that its segments no longer engage the weak field contact $x$, the switches T1 and T2 will simultaneously be moved to the "out" position. The switch T2 in the "out" position will connect the brush on the upper side of the armature PM of the pilot motor with the negative side of the supply, so that the drum DC will be rotated backwards to the "off" position.

The segment MS and the contacts C1, C2 and C3 serve to limit the movement of the drum in either direction, thus for all positions except the extreme positions the contacts C1, C2 and C3 will all be connected together so that the pilot motor can be connected for rotation in either direction. In the extreme uppermost position shown in the drawing, however, the contact C3 has ceased to engage the segment MS and thus the circuit through the pilot motor armature has been broken and accordingly an engagement of the moving contact $d$ of relay CR with the contact $b2$ will be ineffective to excite the pilot motor for backward rotation. On the other hand, a fall in the main motor current causing the relay moving contact $d$ to engage the lower contact $b2$ will be effective to rotate the armature in the forward direction. Similarly, movement in the forward direction is limited by the segment MS, as in the extreme lowermost, i. e., No. 8 position of the drum controller contacts, the contact C1 will cease to make contact with the segment MS, and consequently the pilot motor is unable to rotate the drum controller further in this direction, though it can rotate it backwardly.

The resistances R6 and R7 are simply resistances limiting the flow of current through the pilot motor and enabling the main supply to be applied to the pilot motor, which motor will usually be designed for a lower voltage.

It will be observed that when the pilot motor is connected up for rotation in the one direction R6 will be in series with it and R7 in shunt, whilst in the other direction R7 will be in series with it and R6 in shunt. Since the limiting resistance will have values appreciably greater than that of the resistance of the pilot motor armature the resistance which is in shunt will have a negligible effect.

Whilst in the arrangement specifically described, the shunting circuit has been connected across the whole of the field windings; obviously it may be connected across only portions of said windings.

Alternatively to the employment of shunting circuits, the field windings may be tapped and the tappings varied. Furthermore, instead of a single resistance R5, each field winding may be shunted through a separate circuit all controlled by the drum controller DC.

What I claim as new and desire to secure by Letters Patent of the United States is:

1. An electric locomotive control system comprising in combination with a plurality of driving motors provided with field windings, a resistance, controller means for controlling the speed of said motors and for connecting said motors in parallel with each other for a high speed operation, current responsive means responsive to the current supplied to at least one of said motors rendered effective by said master controller in said maximum speed position, switching means for connecting said resistance in shunt to said field windings and for controlling the amount of said resistance connected in said shunt circuit, a rotary controller for controlling said switching means, a motor for operating said rotary controller controlled by said current responsive means for each direction of rotation so as to operate said rotary controller to increase said resistance in response to an increase in motor current above a predetermined maximum value and reduce said resistance in response to a decrease in motor current below a predetermined minimum value and thus maintain the motor current between said limiting values.

2. An electric vehicle control system comprising in combination with a plurality of driving motors provided with field windings, controller means movable to control the speed of said motors and to connect said motors in parallel with each other for high speed operation, switching means for varying the current in said field windings, current responsive means responsive to the current in at least one of said motors, an operating connection between said switching means and said current responsive means including a member movable to connect said current responsive means to said switching means for operation of said switching means by said current responsive means so as to maintain the motor current between predetermined maximum and minimum values, and an operating connection between said member and said controller means whereby said member is operated to connect said current responsive means to said switching means upon movement of said controller means to a high speed position.

3. An electric vehicle control system comprising in combination with a plurality of driving motors provided with field windings, controller means movable to control the speed of said motors and to connect said motors in parallel with each other for high speed operation, regulating means for varying the current in said field windings, current responsive means responsive to the current in at least one of said motors, electrical connections between said regulating means and said current responsive means including switching means movable to connect said current responsive means to said regulating means for operation of said regulating means by said current responsive means so as to maintain the motor current between predetermined maximum and minimum values, and an operating connection between said switching means and said controller means whereby said switching means is operated to connect said current responsive means to said regulating means upon movement of said controller means to a high speed position.

4. An electric vehicle control system comprising in combination with a plurality of driving motors provided with field windings, controller means movable to control the speed of said motors and to connect said motors in parallel with each other for high speed operation, regulating means including a motor for varying the current in said field windings, current responsive means responsive to the current in at least one of said motors, electrical connections between said motor means and said current responsive means including switching means movable to connect said current responsive means to said motor for operation of said motor by said current responsive means to increase the current in said field windings in response to an increase in the motor current and decrease the current in said field windings in response to a decrease in the motor current, and an operating connection between said switching means and said controller means whereby said switching means is operated to connect said current responsive means to said motor upon movement of said controller means to a high speed position.

5. An electric vehicle control system comprising in combination with a plurality of driving motors provided with field windings, an impedance, controller means for controlling the speed of said motors and for connecting said motors in parallel with each other for high speed operation, current responsive means responsive to the current supplied to at least one of said motors, regulating means for connecting said impedance in circuit with said field windings and for controlling the amount of said impedance connected in circuit with said field windings, connections including switching means for connecting said regulating means to said current responsive means, an operating connection between said switching means and said controller means whereby said switching means is operated upon movement of said controller means to a high speed position to connect said current responsive means to said regulating means for operation of said regulating means to vary said resistance in response to an increase in motor current above a predetermined maximum value and in response to a decrease in motor current below a predetermined minimum value and thus maintain the motor current between said maximum and minimum values.

6. An electric vehicle control system comprising in combination with a plurality of driving motors provided with field windings, a resistance, controller means for controlling the speed of said motors and for connecting said motors in parallel with each other for high speed operation, current responsive means responsive to the currrent supplied to at least one of said motors, regulating means for connecting said resistance in circuit with said field windings and for controlling the amount of said resistance connected in circuit with said field windings, a pilot motor for operating said regulating means, connections including switching means for connecting said pilot motor to said current responsive means for the control of each direction of rotation of said pilot motor, an operating connection between said switching means and said controller means whereby when said controller means is operated to said maximum speed position said switching means is operated to connect said current responsive means to said pilot motor for operation of said regulating means to vary said resistance in response to an increase in motor current above a predetermined maximum value and in response to a decrease in motor current below a predetermined minimum value so as to maintain the motor current between said maximum and minimum values.

FRANK WHYMAN.